United States Patent Office 3,108,884
Patented Oct. 29, 1963

3,108,884
PROCESS FOR RENDERING BEANS
QUICK COOKING
John P. Nielsen, Menlo Park, Calif., assignor to Idaho Bean Commission, an unincorporated association of Idaho
No Drawing. Filed Dec. 22, 1961, Ser. No. 161,398
16 Claims. (Cl. 99—204)

This application is a continuation-in-part of my application Serial No. 816,698, filed May 29, 1959, now abandoned.

This invention relates to a process for rendering dried beans quick cooking. The invention relates primarily to dried beans but may be applied to other similar seeds such as lentils, black-eyed peas and dried green peas.

As is well known, dried beans require a long cooking time. Normally this time is on the order of two and one-half to three hours. In accordance with the present invention, the cooking time is reduced to about 35 minutes. Further, the appearance of the dry beans is essentially unaltered and after cooling the color, flavor and digestibility are excellent and in most instances better than beans which have been cooked for long periods of time.

In the past, various methods have been proposed for rendering beans quick cooking. For the most part, such methods have comprised combinations of soaking and/or cooking followed by dehydration. However, such methods have not been successful and the final product suffers from various defects such as poor color, taste, split or wrinkled skins or difficulty of reconstitution. In accordance with the present invention, all these defects are obviated and the beans which have been treated in accordance with the invention have smooth, unbroken skins, as well as a normal color and the other attributes of normal dried beans.

Generally speaking, the invention is carried out by soaking the beans in a phosphate solution of a specified concentration for a certain time, and dehydration. If desired, the beans may be presoaked and blanched prior to treatment with the phosphate solution although these steps are not generally necessary.

An extensive series of tests has shown that the process of the present invention results in beans which have low flatulence properties so that the gastric distress and social embarrassment which frequently accompanies the eating of beans is largely or wholly eliminated. Thus, the process may be employed in situations wherein quick cooking is not important as in the preparation of canned beans.

Although the invention is not predicated on the theory of its operation, it is believed that the mechanism is somewhat as follows: In the cell walls of the bean structure, there is a large amount of calcium pectate. The calcium pectate is difficult to break down and requires long soaking and/or cooking times. It is believed that the soaking solution acts as a chelating or precipitating agent which disperses the calcium and frees the pectic acid. When the calcium pectate is broken down in this manner, the cooking time is drastically reduced. Further, beans contain inhibitors of the gastric enzymes and the soaking in the phosphate solution in some manner removes or inactivates these inhibitors. Thus, the beans become more digestible.

It is therefore an object of the present invention to render dried beans quick cooking.

A further object of this invention is to treat beans by a soaking and dehydration process wherein the appearance of the beans is not materially altered.

Another object of this invention is to improve the flavor of cooked dried beans.

Another object of this invention is to provide beans of low flatulence properties.

The phosphate solution which is used not only helps break down the calcium pectate but also acts to change the pH of the cooked beans which improves their flavor. If beans are cooked for insufficient lengths of time, they have a relatively coarse texture and a somewhat bitter taste. The flavor and texture of beans is considerably improved if cooked for a long time, but this is achieved in a short cooking time in accordance with the present invention. Further, the pH of cooked untreated beans is from about 6.0 to 6.2 while the pH of cooked beans processed in accordance with the present invention is 6.4 to 7, greatly improving their flavor.

The phosphate solutions which are used can be prepared from any sodium, potassium or lithium phosphate salts but it is normally preferred to use the sodium salts of phosphoric acid since they are readily available, of low cost and have no adverse effect upon the taste of cooked beans. It is important that the phosphate solution have the correct pH and a pH in the range of 6.6 to 10.7 and preferably from 8 to 10.7 is employed. If the pH is substantially lower than this, unduly long soaking times will be required. If the pH is higher than this, the skins of the beans will become wrinkled and discolored, making an unattractive product. The concentration of the phosphate ion ($PO_4$) can be from .01 to 0.2 and is preferably from about .01 to 0.15 mole per liter of solution and more preferably 0.03 to 0.09 mole per liter or, even better, 0.03 to 0.07 mole per liter. If several changes in the soaking solution are used, the concentration can be in the lower end of the ranges given while if only a single solution is used, the concentration of the phosphate solution should be at the higher end of the range.

Monosodium, disodium or trisodium phosphate can be used alone or in various combinations. Ordinarily the selection of the salt to be used will depend on the pH desired, although one can select a salt which does not give the desired pH and then adjust the acidity or alkalinity of the solution by adding an acid or base thereto. Thus, if monosodium phosphate is used, an alkali, such as sodium hydroxide, can be added to the solution while if trisodium phosphate is used, an acid, such as phosphoric acid, can be added to the solution to bring the pH into the above specified range. If disodium phosphate is used, little or no pH adjustment is necessary. Mixtures of phosphates can be used, one suitable phosphate solution containing 0.017 mole $Na_2HPO_4$ and 0.017 mole $Na_3PO_4$ per liter. In addition to the phosphate it has been found that a small amount of common salt may be added to the solution for superior results. An amount of from 0.5 to 1.5% by weight may be used.

The phosphate soaking solution is prepared to have the desired pH and phosphate ion concentration and about 3 to about 5 parts by weight of the soaking solution are used for each part of beans treated, although the exact amount of solution used is not critical. At least as much solution should be used as will keep the beans covered throughout the soaking period. The soaking time is preferably from about two to five hours at a temperature of 45° to 50° C., although the temperature can vary from as low as 40° to as high as 55° C. With some beans having delicate skins, such as small white beans, the soaking time can be reduced somewhat. It has been found that the temperature of soaking is quite critical. If the temperature is below 40° C., the soaking time is unduly long and the beans will sour before the desired results are achieved. If the temperature is too high, undesirable results will be produced. For instance, at 60° C., the beans will be wrinkled upon drying. In the case of red beans, they will have a brown or purplish color, while in the case of white beans, they will have a yellowish color. Soaking may be accomplished merely by immersing the beans in the phosphate solution or agitation or circulation of the solution may be employed. Further, a single solution may be used or a series of soaks may be employed. If a series of soaks is used, the pH may vary and is preferably lowered for the last soak. For instance, three soaks at a pH of 9.6, followed by a single soak at a pH of 6 or 7, have been used. Further, the last soak may be followed by an acid wash, particularly if a high pH has been used in the soaking, or if color is benefited.

After soaking, the beans are drained and dried. Drying is preferably accomplished in two stages. First, the beans are subjected to a temperature of from about 80° to 110° C. for from about 45 to 90 minutes to reduce the moisture content of the beans to between about 18 percent and about 40 percent, and then the temperature is lowered to between about 40° and about 75° C. and drying is completed at this lower temperature for a period of from 12 to 18 hours whereby the moisture content of the beans is reduced to between 6 percent and 15 percent. If the temperature of the beans is allowed to get too high, i.e., over 65° C., the beans will have a poor color and flavor and the quick cooking properties may be impaired. The higher temperature is permitted when the beans are wet since the evaporating water keeps the beans themselves at a temperature lower than the ambient air. However, as the beans approach dryness, it is preferable to lower the temperature in order to obtain maximum quality of color and flavor. Although it is usually most convenient to use two fixed temperatures, it is feasible to gradually lower the temperature while the beans are drying. Further, it is possible to do all the drying at a temperature of say 40° C., although a longer period of time is required. Generally speaking, the beans are dried to a dryness of about 18 to 25 percent moisture at the higher temperature and drying is continued to a moisture content of from 6 to 15 or preferably 6 to 10 percent at the lower temperature. When drying is complete, the beans will have a moisture content normal for dry beans and will be substantially identical in appearance to untreated beans. Various types of dryers may be used, such as fixed tray, moving tray, continuous belt, cylinder, dielectric, infrared and other dryers.

The following non-limiting examples illustrate various methods of carrying out the present invention.

*Example 1.*—A quantity of 100 grams of pinto beans was soaked in water at 50° C. for one-half hour. Sufficient water was used to keep the beans covered at all times. The beans were then removed from the water, and blanched in steam at 90° C. for 2 minutes. Immediately thereafter, the beans were placed in 300 cc. of a phosphate soaking solution which was maintained at a temperature of 45° C. The phosphate soaking solution had a concentration of 0.034 M trisodium phosphate adjusted to a pH of 9 with phosphoric acid. The beans were soaked in this phosphate solution for a period of three hours and then were drained and placed in a dryer maintained at a temperature of 80° C. for about 50 minutes, whereupon the moisture content of the beans was 20 percent. The temperature of the drier was then reduced to 40° C. and drying was continued for about 15 hours at which time the beans had a moisture content of 8 percent. The beans appear similar to beans which have not been treated but upon cooking them in the normal manner, it was found that they had a good color, flavor and texture with only 45 minutes of cooking. Similar beans, but untreated, required a cooking time of 3 hours to achieve the same degree of softness.

*Example 2.*—The process of Example 1 was repeated using kidney beans, Great Northern beans, California small white beans, red kidney beans and small red beans. In each instance, the beans developed the quick cooking properties enumerated above, although because of the difference in size of the beans the larger beans required a longer soaking and drying time than the smaller.

*Example 3.*—In an effort to determine the optimum blanching time, beans were processed in accordance with Example 1 utilizing blanching times ranging from 1 minute to about 6 minutes. It was found that with a blanching time of over 4 minutes, the beans darkened and shriveled and had a glazed or water-soaked appearance when dried. A 2-minute blanch was found to be about optimum with 4 minutes as the maximum blanching time.

*Example 4.*—Another series of tests was run to determine the ideal soaking temperature in the phosphate solution. It was found that the operable temperature is between 40° to 55° C. and ideally between 45° to 50° C. If the temperature is reduced below 40° C., the beans are not sufficiently soft when cooked for 40 minutes. For instance, at 40° C. only 85 percent of the beans were soft when cooked for 40 minutes while at 50° C. 98 percent of the beans were soft. On the other hand, if the temperature was raised, the beans became dark and wrinkles appeared on them. Above 55° C., it was judged that the appearance of the beans was unsatisfactory.

*Example 5.*—In an effort to determine the correct pH of the soaking solution, the process of Example 1 was repeated except that different ratios of mono-, di- and trisodium phosphate or phosphoric acid plus trisodium phosphate were used to vary the pH. It was found that below pH 6.6, the color was too pale and the cooked beans had a poor texture, while at 6.7 to 7.9 the color was pale but acceptable and that a pH of 8 to 10.7 gave the best color range. At a pH above 10.7, the color of the beans was noticeably darkened.

*Example 6.*—Experiments were run to determine the optimum soaking time in the phosphate solution. It was found that under 2 hours did not yield a product having satisfactory softness while if the soaking time was increased beyond about 4 hours, no improvement of quality was found. It was thus determined that the soaking time should vary from 2 to 4 hours.

*Example 7.*—It was found that the appearance of some of the beans, particularly small red kidney or white beans, could be improved by first soaking them in the phosphate solution as described and then soaking in a solution made up of 0.07 M monosodium phosphate and 5 percent glycerine for 15 minutes just prior to drying. Some beans have a tendency to change color slightly, i.e. the red kidney beans turn brown and the white beans turn cream or yellow if this step is omitted. Some beans, after drying, tend to have a high percentage of split skins. The color of such beans is considerably enhanced and splitting is minimized by soaking in the phosphate-glycerine solution.

The examples of the following table illustrate various treatment conditions and the results obtained. In each instance the cooked beans were cooked for 35 minutes in water before evaluation.

| Ex. | Treatment conditions ||||||||  Quality of cooked beans |||||
|---|---|---|---|---|---|---|---|---|---|---|---|---|---|
| | Temp., °C. | Sodium phosphate conc., percent[1] | Soak, pH | Salt conc. | Soln. changes[2] | Total soak time, hours | Type of soak | Dry appearance | Soft texture, percent | Med. texture, percent | Texture score[3] | Appearance | Cook water, pH |
| 8 GN | 48 | 0.35 | 9.6 | 1.0 | 4 | 5 | Agitated | Natural | 53 | 45 | 151 | Cream | 6.6 |
| 9 GN | 48 | 0.35 | 9.6 | 0.0 | 4 | 5 | do | do | 8 | 90 | 106 | do | 6.6 |
| 10 GN | 48 | 0.35 | 9.6 | 1.0 | 1 | 2 | do | do | 30 | 61 | 121 | do | 6.6 |
| 11 GN | 48 | 0.35 | 9.6 | 1.0 | 7 | 8 | do | do | 50 | 50 | 150 | do | 6.7 |
| 12 GN | 48 | 0.35 | 8.0 | 1.0 | 4 | 5 | do | do | 28 | 72 | 128 | do | 6.5 |
| 13 GN | 48 | 0.35 | 10.5 | 1.0 | 4 | 5 | do | Yellow | 34 | 66 | 134 | do | 6.7 |
| 14 GN | 48 | 0.35 | 11.1 | 0.0 | 4[4] | 3.5 | Still | Yellow, shriveled | 0 | 100 | 100 | do | 6.7 |
| 15 GN | 48 | 0.70 | 9.6 | 1.0 | 4 | 5 | Agitated | Natural | 80 | 20 | 180 | do | 6.7 |
| 16 GN | 48 | 0.50 | 9.6 | 0.0 | 4[4] | 3.5 | Still | Sl. shriveled | 44 | 52 | 140 | do | 6.5 |
| 17 P | 48 | 0.35 | 9.6 | 1.0 | 4 | 5 | Agitated | Natural | 94 | 6 | 194 | Lt. brown | 6.6 |
| 18 P | 48 | 0.35 | 9.6 | 0.0 | 4 | 5 | do | do | 44 | 56 | 144 | do | 6.6 |
| 19 P | 48 | 0.35 | 9.6 | 1.0 | 1 | 2 | do | do | 67 | 29 | 163 | do | 6.6 |
| 20 P | 48 | 0.35 | 9.6 | 1.0 | 7 | 8 | do | do | 64 | 34 | 162 | Md. brown | 6.7 |
| 21 P | 48 | 0.35 | 8.0 | 1.0 | 4 | 5 | do | do | 45 | 55 | 145 | Lt. brown grey | 6.5 |
| 22 P | 48 | 0.35 | 10.5 | 1.0 | 4 | 5 | do | do | 62 | 34 | 158 | Lt. brown | 6.7 |
| 23 P | 48 | 0.70 | 11.6 | 0.0 | 4[4] | 3.5 | Still | Dark, shriveled | 71 | 29 | 171 | Red brown | 7.2 |
| 24 P | 48 | 0.35 | 11.1 | 0.0 | 4[4] | 3.5 | do | do | 16 | 76 | 108 | Brown grey | 6.7 |
| 25 P | 48 | 0.35 | 9.6 | 1.0 | 0 | 5 | do | Natural | 4 | 65 | 73 | Red brown | 6.3 |
| 26 P | 48 | 0.50 | 9.6 | 0.0 | 4[4] | 3.5 | do | Nat. sl. shriveled | 37 | 63 | 137 | Lt. brown | 6.6 |
| 27 P | 48 | 0.70 | 9.6 | 1.0 | 4 | 5 | Agitated | Red-brown | 94 | 6 | 194 | Med. brown | 6.8 |
| 28 P | 48 | 0.35 | 9.6 | 2.0 | 4 | 5 | do | Natural | 75 | 23 | 173 | Lt. brown | 6.5 |

NOTE.—GN = Great Northern beans. P = Pinto beans.

[1] Trisodium phosphate on anhydrous basis. [2] Water indicates presoak in water followed by phosphate solution soak. [3] Texture score equals 2 times percent soft texture plus 1 times percent medium texture. [4] Water.

The following examples illustrate a large-scale commercial practice of the invention on navy and kidney beans:

Soaking

| | Navy beans | Kidney beans |
|---|---|---|
| A. Pressure | Atmospheric | Atmospheric. |
| B. Temperature | 48° C | 45° C. |
| C. Time | 3.5 hours | 4 hours. |
| D. Liquid to bean ratio | 4.75:1 | 4.75:1. |
| E. Circulation rate and direction | 3-6 ft./min. upward | 3-6 ft./min. upward. |
| F. pH | 8.5-8.9 | 8.5-8.9. |
| G. Phosphate ion ($PO_4$) concentration from orthophosphate | 0.1 molar | 0.15 molar. |
| H. Type of phosphate | Disodium | Disodium. |

Drying

| | Navy beans | Kidney beans |
|---|---|---|
| A. First stage: | | |
| 1. Type dryer | Roto-louvre | Roto-louvre. |
| 2. R.p.m. | 15 | 15. |
| 3. Inlet air temp | 88-110° C | 90-105° C. |
| 4. Maximum bean temp | 63° C | 60° C. |
| 5. Retention time | 60 minutes | 60 minutes. |
| 6. Product moisture content from dryer | 32-34% | 35-40%. |
| B. Second stage: | | |
| 1. Type dryer | Aero-glide | Aero-glide. |
| 2. Inlet air temp.: | | |
| Top | 55-71° C | 55-71° C. |
| Middle | 43-59° C | 43-59° C. |
| Lower | 35-50° C | 35-50° C. |
| 3. Retention time | 12 hours | 12 hours. |
| 4. Product moisture content from dryer | 11-13% | 11-13%. |

I claim:

1. The process of rendering dried beans quick cooking comprising soaking the beans for about three hours at a temperature of from 40 to 55° C. in a phosphate solution wherein the concentration of the phosphate ion is from 0.03 to 0.09 mole per liter, said solution having a pH of from 6.6 to 10.7 and then drying the beans to a moisture content of from 6 to 10%.

2. The process of claim 1 wherein the concentration of phosphate ion is maintained at between 0.03 and 0.07 M.

3. The process of claim 1 wherein the pH of the soaking solution is maintained at from 8 to 10.7.

4. The process of claim 1 wherein the beans are dried under conditions whereby the beans themselves are not allowed to rise to a temperature of over 65° C.

5. The process of claim 4 wherein the beans are dried at a temperature of about 80° C. for a period of time ranging from 45 to 90 minutes whereby the moisture content of the beans is reduced to from 18 to 25 percent and wherein the temperature is then reduced to 40° C. and drying continued for an additional period of from 12 to 18 hours whereby the moisture content of the beans is from 6 to 10 percent.

6. The process of claim 1 wherein the temperature of the soaking solution is from about 45 to about 50° C.

7. The process of claim 1 wherein the beans are subjected to a pre-treatment comprising soaking the beans in water for a period of about one-half hour at 50° C. and blanching at 90° C. for a time of from 2 to 4 minutes.

8. The process of claim 1 wherein the beans, after having been soaked in the phosphate solution, are transferred to a solution containing about 0.07 M monosodium phosphate and 5% glycerine for a period of about 15 minutes prior to drying.

9. The process of rendering beans quick cooking comprising soaking the beans for from about 2 to about 5 hours in a phosphate solution at a temperature of from 40° to 55° C. wherein the concentration of the phosphate ion is from about 0.01 to about 0.2 mole per liter, said solution having a pH of from about 6.6 to about 10.7, and then drying the beans to a moisture content of from 6 to 15 percent.

10. The process of claim 9 wherein the soaking solution is circulated through the beans.

11. The process of claim 9 wherein the soaking is conducted under conditions of agitation.

12. The process of claim 9 wherein the soaking is conducted in a series of solutions.

13. The process of claim 12 wherein at least a first phosphate soak and a last phosphate soak are employed and wherein a first soak is conducted at a ph of about 9.6 and the last soak is conducted at a pH of about 6 to 7.

14. The process of claim 9 wherein the phosphate solution contains from 0.5 to 1.5 percent by weight of NaCl.

15. The process of claim 9 wherein soaking is followed by an acid wash.

16. The process of rendering dried beans quick cooking comprising soaking the beans in water at a temperature of about 50° C. for about one-half hour, blanching the beans at about 90° C. for about 2 minutes, soaking the beans at a temperature of from about 40° to 55° C. for about 3 hours in a solution containing about 0.017 mole $Na_2HPO_4$ and about 0.017 mole per liter $Na_3PO_4$ and drying the beans to a moisture content of from about 6 to 10 percent while maintaining the beans at a temperature of not over 65° C.

References Cited in the file of this patent

UNITED STATES PATENTS

| | | |
|---|---|---|
| 1,813,268 | Bachler | July 7, 1931 |
| 1,859,279 | Chamberlain | May 24, 1932 |
| 2,278,468 | Musher | Apr. 7, 1942 |

FOREIGN PATENTS

| | | |
|---|---|---|
| 480,871 | Great Britain | Mar. 2, 1938 |